United States Patent
Futahashi et al.

(10) Patent No.: US 10,591,084 B2
(45) Date of Patent: Mar. 17, 2020

(54) STEAM VALVE AND STEAM TURBINE SYSTEM

(71) Applicant: Mitsubishi Hitachi Power Systems, Ltd., Kanagawa (JP)

(72) Inventors: Kensuke Futahashi, Tokyo (JP); Hiroyuki Kanazawa, Tokyo (JP); Kengo Imaoka, Tokyo (JP); Katsuhisa Hamada, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 25 days.

(21) Appl. No.: 15/771,518

(22) PCT Filed: Nov. 4, 2016

(86) PCT No.: PCT/JP2016/082784
§ 371 (c)(1),
(2) Date: Apr. 27, 2018

(87) PCT Pub. No.: WO2017/082163
PCT Pub. Date: May 18, 2017

(65) Prior Publication Data
US 2018/0340627 A1  Nov. 29, 2018

(30) Foreign Application Priority Data
Nov. 12, 2015  (JP) .................. 2015-221837

(51) Int. Cl.
*F16K 1/44* (2006.01)
*F16K 31/44* (2006.01)
(Continued)

(52) U.S. Cl.
CPC .............. *F16K 31/44* (2013.01); *F01D 17/10* (2013.01); *F01D 17/141* (2013.01); *F01D 17/18* (2013.01);
(Continued)

(58) Field of Classification Search
USPC ..................................... 137/637.2
See application file for complete search history.

(56) References Cited

U.S. PATENT DOCUMENTS

| | | | | |
|---|---|---|---|---|
| 966,797 A | * | 8/1910 | Conrader | F16K 1/443 137/614.21 |
| 3,529,630 A | * | 9/1970 | Podolsky | F16K 1/44 137/630.13 |

(Continued)

FOREIGN PATENT DOCUMENTS

| | | |
|---|---|---|
| CN | 1708635 | 12/2005 |
| DE | 25 33 519 | 3/1977 |

(Continued)

OTHER PUBLICATIONS

International Search Report dated Jan. 17, 2017 in International (PCT) Application No. PCT/JP2016/082784.

(Continued)

*Primary Examiner* — John Fox
(74) *Attorney, Agent, or Firm* — Wenderoth, Lind & Ponack, L.L.P.

(57) ABSTRACT

A steam valve includes: a valve casing; a first valve body; a second valve body; a second valve rod; a first valve rod; a first actuator capable of applying a first biasing force in the vertical direction to the first valve rod; a second actuator capable of applying a second biasing force in the vertical direction to the second valve rod; a first link mechanism disposed between the first actuator and the first valve rod and capable of transmitting the first biasing force; a second link mechanism disposed between the second actuator and the second valve rod and capable of transmitting the second biasing force, the second link mechanism having a linking part provided integrally with the second valve rod and a lever which is pin-coupled to the linking part; and a guide (Continued)

mechanism capable of regulating horizontal displacement of the linking part.

12 Claims, 10 Drawing Sheets

(51) Int. Cl.
*F01D 17/14* (2006.01)
*F16K 31/16* (2006.01)
*F01D 17/18* (2006.01)
*F01D 17/10* (2006.01)

(52) U.S. Cl.
CPC ................ *F16K 1/44* (2013.01); *F16K 1/443* (2013.01); *F16K 31/16* (2013.01); *F05D 2220/31* (2013.01)

(56) References Cited

U.S. PATENT DOCUMENTS

| | | | | |
|---|---|---|---|---|
| 4,092,214 | A | * | 5/1978 | Schabert ............... F16K 17/168 137/599.16 |
| 4,500,070 | A | * | 2/1985 | Riollet .................... F16K 47/04 251/282 |
| 5,971,018 | A | | 10/1999 | Karlsson et al. |
| 9,650,910 | B2 | * | 5/2017 | Futahashi ............... F01D 17/10 |
| 2012/0137688 | A1 | * | 6/2012 | Batwal .................. F01D 17/145 60/660 |
| 2015/0322812 | A1 | | 11/2015 | Futahashi et al. |
| 2016/0169030 | A1 | * | 6/2016 | Kahl ....................... F16K 1/443 251/63 |

FOREIGN PATENT DOCUMENTS

| | | |
|---|---|---|
| DE | 29 48 639 | 6/1981 |
| EP | 2 270 370 | 1/2011 |
| JP | 52-030558 | 3/1977 |
| JP | 03-015606 | 1/1991 |
| JP | 06-185305 | 7/1994 |
| JP | 2001-221008 | 8/2001 |
| JP | 2002-097903 | 4/2002 |
| JP | 2008-175267 | 7/2008 |
| JP | 2008-185012 | 8/2008 |
| JP | 4881231 | 2/2012 |
| WO | 2011/000733 | 1/2011 |
| WO | 2014/098073 | 6/2014 |

OTHER PUBLICATIONS

International Preliminary Report on Patentability dated May 24, 2018 in International (PCT) Application No. PCT/JP2016/082784.
Korean Office Action dated Jun. 28, 2019 in corresponding Korean Application No. 10-2018-7012651 with Machine Translation.
Japanese Notice of Reasons for Refusal dated Jul. 16, 2019 in corresponding Japanese Patent Application No. 2015-221837 with English translation.
Chinese Office Action dated Jul. 29, 2019 in corresponding Chinese Patent Application No. 201680063574.0 with Machine Translation.

* cited by examiner

STEAM VALVE AND STEAM TURBINE SYSTEM

TECHNICAL FIELD

The present disclosure relates to a steam valve and a steam turbine system.

BACKGROUND ART

In a steam supply passage to a steam turbine, a steam control valve capable of adjusting the steam supply amount and a steam stop valve capable of stopping supply of steam are disposed.

For instance, Patent Document 1 discloses a steam valve having a stop valve body and a control valve body, whereby the single steam valve has the two functions of a steam stop valve and a steam control valve by itself. Thus, in a case where the steam valve disclosed in Patent Document 1 is used, it is possible to reduce pressure loss as compared to a case in which a steam stop valve and a steam control valve are provided separately.

CITATION LIST

Patent Literature

Patent Document 1: WO2014/098073A

SUMMARY

Problems to be Solved

The steam valve disclosed in Patent Document 1 includes a lever that is pin-coupled to an outer end portion of a stop valve rod, and the stop valve rod and the stop valve body move up and down in response to tilting of the lever. When the lever tilts, a lateral force is applied in the horizontal direction to the outer end portion of the stop valve rod. When such a lateral force is applied to the stop valve rod and the stop valve rod tilts, the stop valve rod may make contact partially with a nearby part. Such partial contact may cause uneven wear and galling and thus not preferable.

In view of the above issue, an object of at least one embodiment of the present invention is to provide a steam valve and a steam turbine system including the steam valve, whereby it is possible to control horizontal displacement of a pin linking part between a valve rod and a lever with a simplified configuration.

Solution to the Problems (1) A steam valve according to at least one embodiment of the present invention includes: a valve casing having a valve chest, an inlet flow passage having an opening into the valve chest, an outlet flow passage having an opening into the valve chest, and a valve seat surrounding the opening of the outlet flow passage; a first valve body housed in the valve chest and capable of making contact with the valve seat in a vertical direction; a second valve body housed in the valve chest coaxially with the first valve body and capable of making contact with the valve seat in the vertical direction; a second valve rod inserted through an upper section of the valve casing in the vertical direction and extending from the second valve body to an outside of the valve casing; a first valve rod inserted through an inside of the second valve rod and extending from the second valve body to the outside of the valve casing; a first actuator disposed outside the valve casing and capable of applying a first biasing force in the vertical direction to the first valve rod; a second actuator disposed outside the valve casing and capable of applying a second biasing force in the vertical direction to the second valve rod; a first link mechanism disposed between the first actuator and the first valve rod and capable of transmitting the first biasing force; a second link mechanism disposed between the second actuator and the second valve rod and capable of transmitting the second biasing force, the second link mechanism having a linking part provided integrally with the second valve rod and a lever which is pin-coupled to the linking part; and a guide mechanism capable of regulating horizontal displacement of the linking part when the linking part moves in the vertical direction in response to tilting of the lever.

With the above configuration (1), the guide mechanism regulates horizontal displacement of the linking part to which the lever is pin-coupled, and thus it is possible to prevent partial contact of the second valve rod and a nearby part with a simplified configuration.

(2) In some embodiments, in the above configuration (1), the guide mechanism includes: a support frame disposed above the valve casing; a pair of guide plates each extending in the vertical direction, and holding the linking part from both sides in a horizontal direction; and a pair of support portions each fixed to the support frame, and supporting the pair of guide plates respectively.

With the above configuration (2), the guide plates regulate horizontal displacement of the linking part to which the lever is pin-coupled, and thus it is possible to prevent partial contact of the second valve rod and a nearby part with a simplified configuration.

(3) In some embodiments, in the above configuration (2), the linking part has curved surfaces in regions facing the guide plates.

With the above configuration (3), the linking part has the curved surfaces, and thus partial contact between the linking part and the guide plates is prevented, which makes it possible to prevent partial contact between the second valve rod and a nearby part even more reliably.

(4) In some embodiments, in the above configuration (2), the linking part includes inclined surfaces on an upper side and a lower side of regions facing the guide plates.

With the above configuration (4), the linking part has the inclined surfaces on the upper side and the lower side of the regions facing the guide plates, and thus partial contact between the linking part and the guide plates is prevented, which makes it possible to prevent partial contact between the second valve rod and a nearby part even more reliably.

(5) In some embodiments, in any one of the above configurations (2) to (4), one of the linking part or each guide plate has a groove extending in the vertical direction, and the other one of the linking part or each guide plate has a protrusion which is in engagement with the groove so as to be slidable in the groove.

With the above configuration (5), the protrusion is in engagement with the groove extending in the vertical direction and thereby the linking part moves in the vertical direction reliably, and thus partial contact between the linking part and the guide plates is prevented, which makes it possible to prevent partial contact between the second valve rod and a nearby part even more reliably.

(6) In some embodiments, in any one of the above configurations (2) to (5), one of the linking part or each guide plate has a surface comprising a heat-resistant resin in a region facing the other one of the linking part or each guide plate.

With the above configuration (6), one of the linking part or each guide plate includes the surface made of heat-resistant resin in a region facing the other one of the linking part or the guide plate, and thus the linking part can move up and down smoothly even if the temperature of the linking part or the guide plate increases.

(7) In some embodiments, in the above configuration (1), the guide mechanism includes: a support frame disposed above the valve casing; a guide cylinder interposed between the first valve rod and the linking part; and a support portion fixed to the support frame and supporting the guide cylinder.

With the above configuration (7), the guide cylinder regulates horizontal displacement of the linking part to which the lever is pin-coupled, and thus it is possible to prevent partial contact of the second valve rod and a nearby part with a simplified configuration.

(8) In some embodiments, in the above configuration (7), the guide cylinder has a curved surface in a lower-end side region facing the linking part.

With the above configuration (8), the guide cylinder has the curved surface in the lower-end side region facing the linking part, and thus partial contact between the linking part and the guide cylinder is prevented, which makes it possible to prevent partial contact between the second valve rod and a nearby part even more reliably.

(9) In some embodiments, in the above configuration (7), the guide cylinder has a tapered surface in a lower-end side region facing the linking part.

With the above configuration (9), the guide cylinder has the tapered surface in the lower-end side region facing the linking part, and thus partial contact between the linking part and the guide cylinder is prevented, which makes it possible to prevent partial contact between the second valve rod and a nearby part even more reliably.

(10) In some embodiments, in any one of the above configurations (7) to (9), one of the linking part or the guide cylinder has a groove extending in the vertical direction, and the other one of the linking part or the guide cylinder has a protrusion in engagement with the groove so as to be slidable in the groove.

With the above configuration (10), the protrusion is in engagement with the groove extending in the vertical direction and thereby the linking part moves in the vertical direction reliably, and thus partial contact between the linking part and the guide cylinder is prevented, which makes it possible to prevent partial contact between the second valve rod and a nearby part even more reliably.

(11) In some embodiments, in any one of the above configurations (7) to (10), one of the linking part or the guide cylinder has a surface comprising a heat-resistant resin in a region facing the other one of the linking part or the guide cylinder.

With the above configuration (11), one of the linking part or the guide cylinder includes the surface made of heat-resistant resin in a region facing the other one of the linking part or the guide cylinder, and thus the linking part can move up and down smoothly even if the temperature of the linking part or the guide cylinder increases.

(12) A steam turbine system according to at least one embodiment of the present invention includes: the steam valve according to any one of the above (1) to (11); and a steam turbine configured to be supplied with steam from the steam valve.

With the above configuration (12), the steam turbine is supplied with steam from the steam valve according to any one of the above (1) to (11). In the steam valve, partial contact of the second valve rod and a nearby part is prevented through a simplified configuration, and thus the steam turbine system has a high reliability.

Advantageous Effects

According to at least one embodiment of the present invention, it is possible to provide a steam valve and a steam turbine system including the steam valve, whereby it is possible to control horizontal displacement of a pin linking part between a valve rod and a lever, with a simplified configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
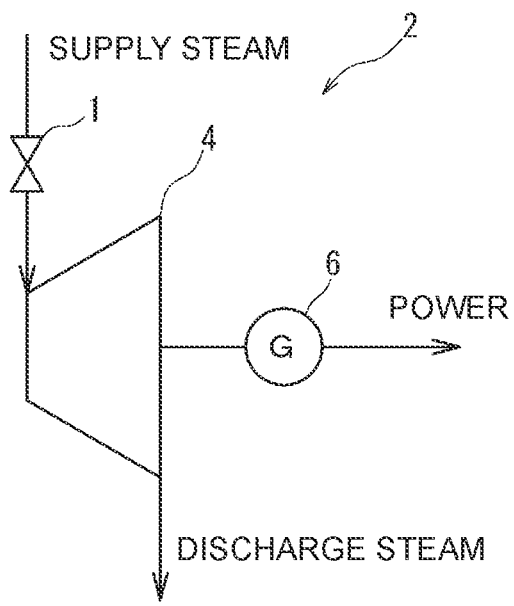
FIG. 1 is a schematic configuration diagram of a steam turbine system to which a steam valve according to an embodiment of the present invention is applied.

FIG. 1 is a schematic configuration diagram of a steam turbine system 2 to which a steam valve 1 according to an embodiment of the present invention is applied.

The steam turbine system 2 includes a steam valve 1, and a steam turbine 4 to which steam (supply steam) is supplied from the steam valve 1. The steam turbine 4 is capable of converting energy of steam supplied thereto into power and outputting the power. The steam after extraction of energy (exhaust steam) is discharged from the steam turbine 4. For instance, power outputted by the steam turbine 4 is transmitted to the generator 6, and the generator 6 generates electric power by utilizing the power.

Figure 2:
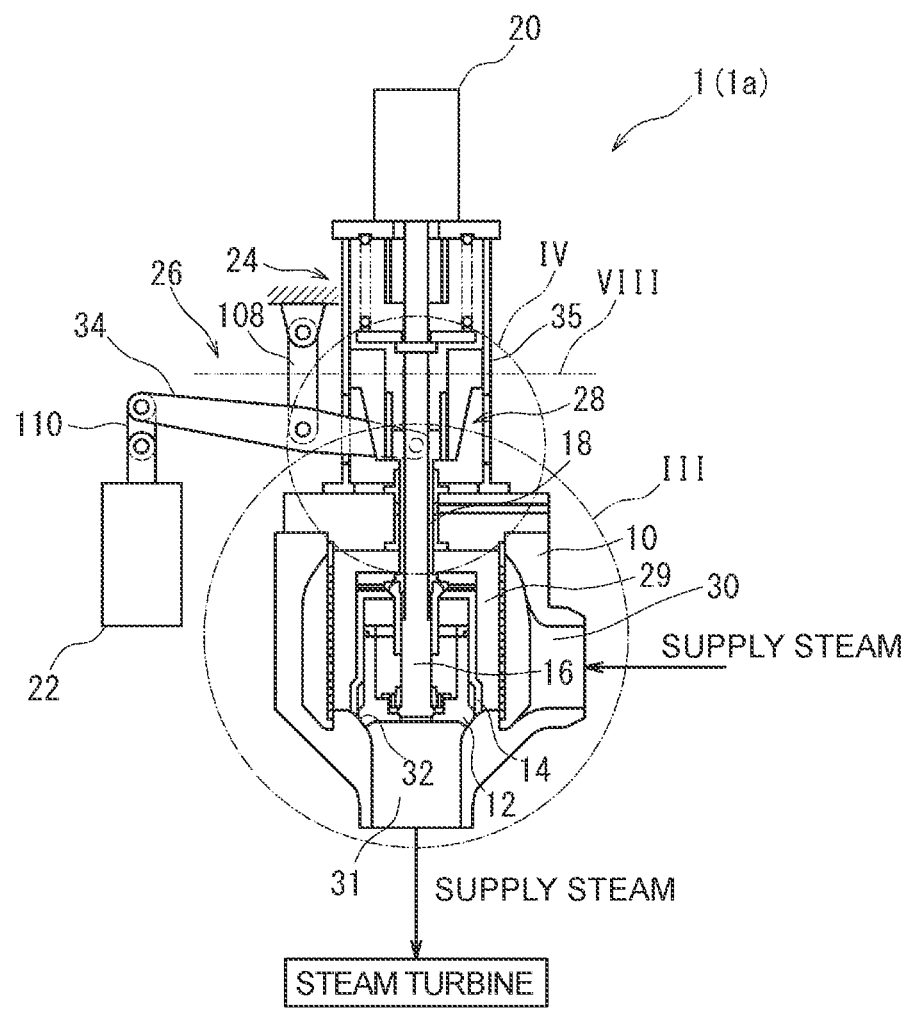
FIG. 2 is a schematic cross-sectional view of a steam valve according to an embodiment of the present invention.
Figure 3:
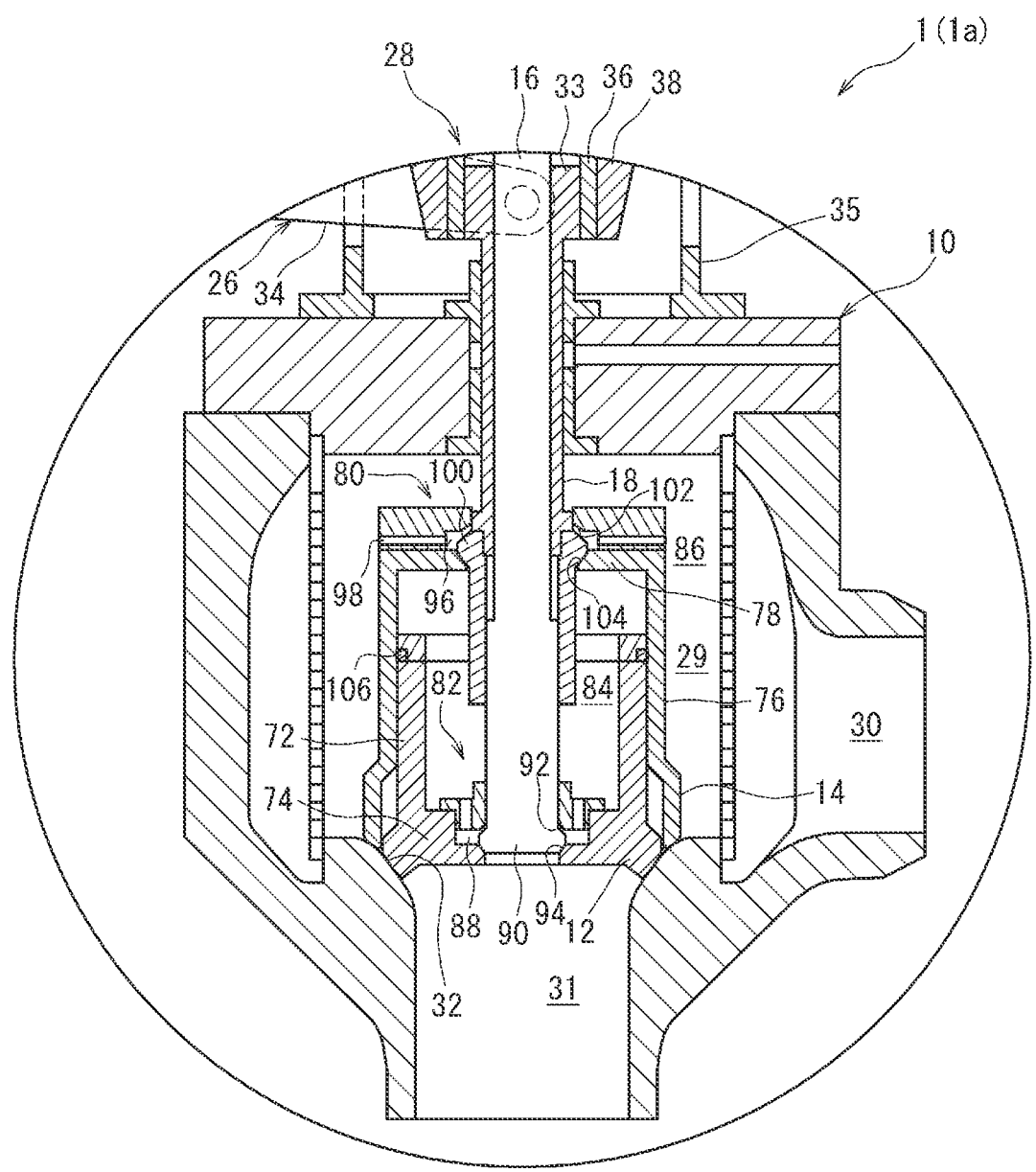
FIG. 3 is an enlarged schematic view of the region III in FIG. 2.
Figure 4:
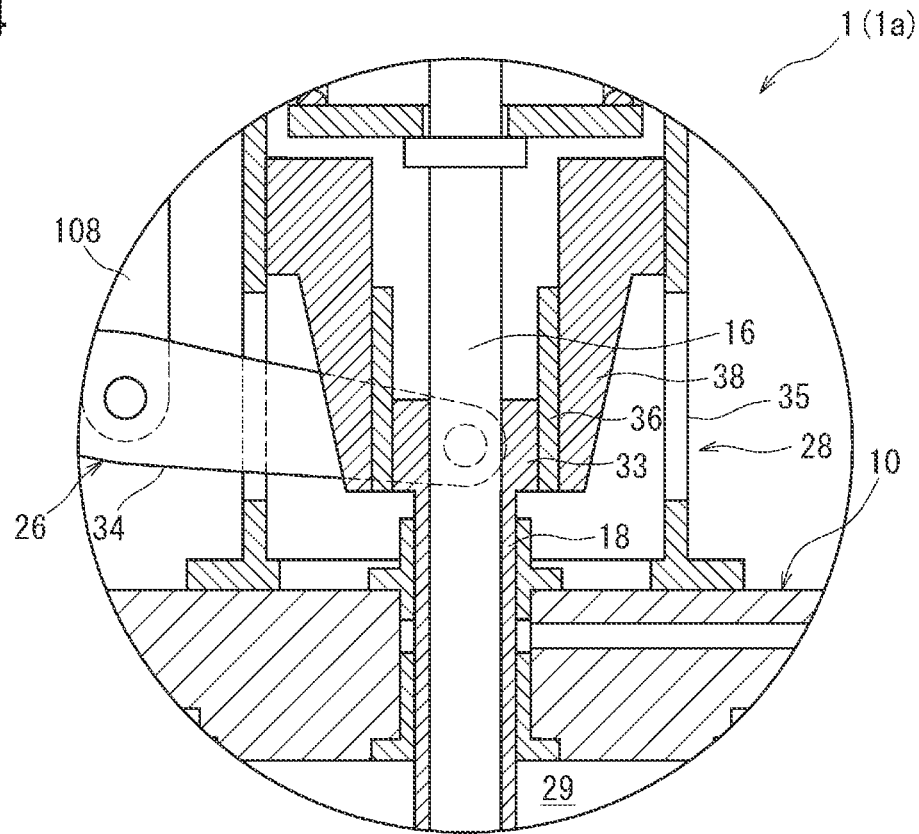
FIG. 4 is an enlarged schematic view of the region IV in FIG. 2.
Figure 5:
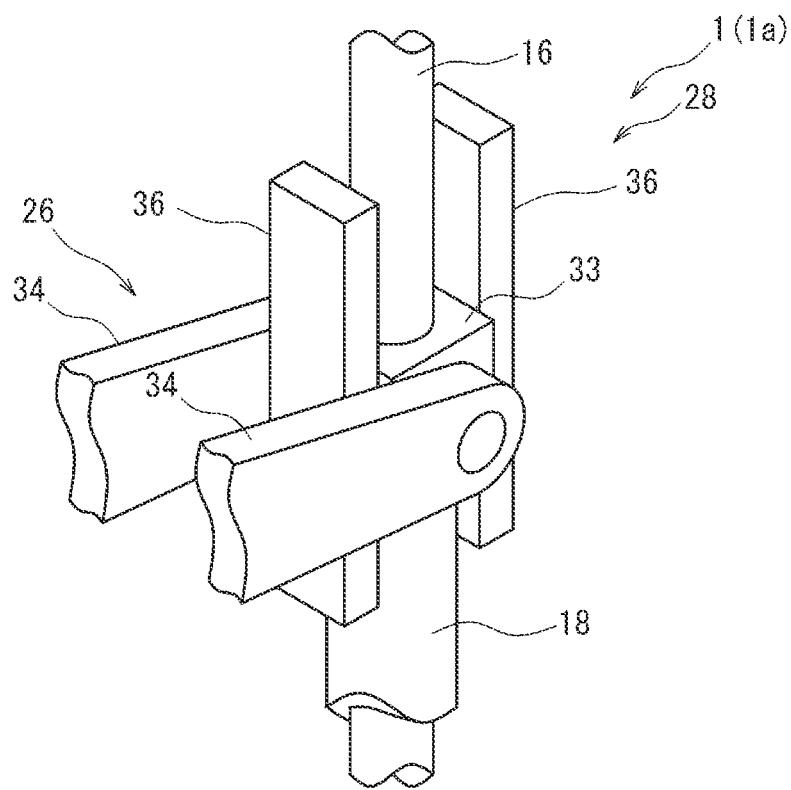
FIG. 5 is a perspective enlarged view schematically showing a linking part between the second valve rod and a lever and its surrounding part in FIG. 4.
Figure 6:
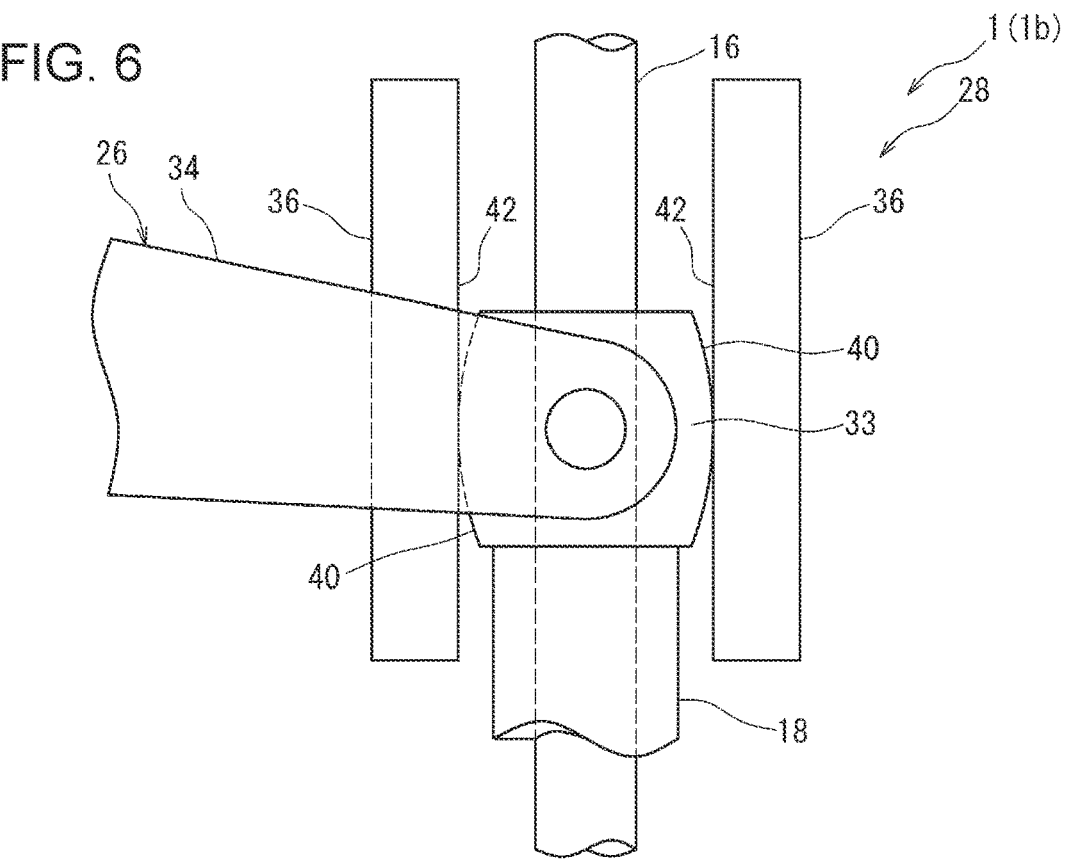
FIG. 6 is an enlarged side view schematically showing a linking part between the second valve rod and a lever and its surrounding, of a steam valve according to another embodiment.
Figure 7:
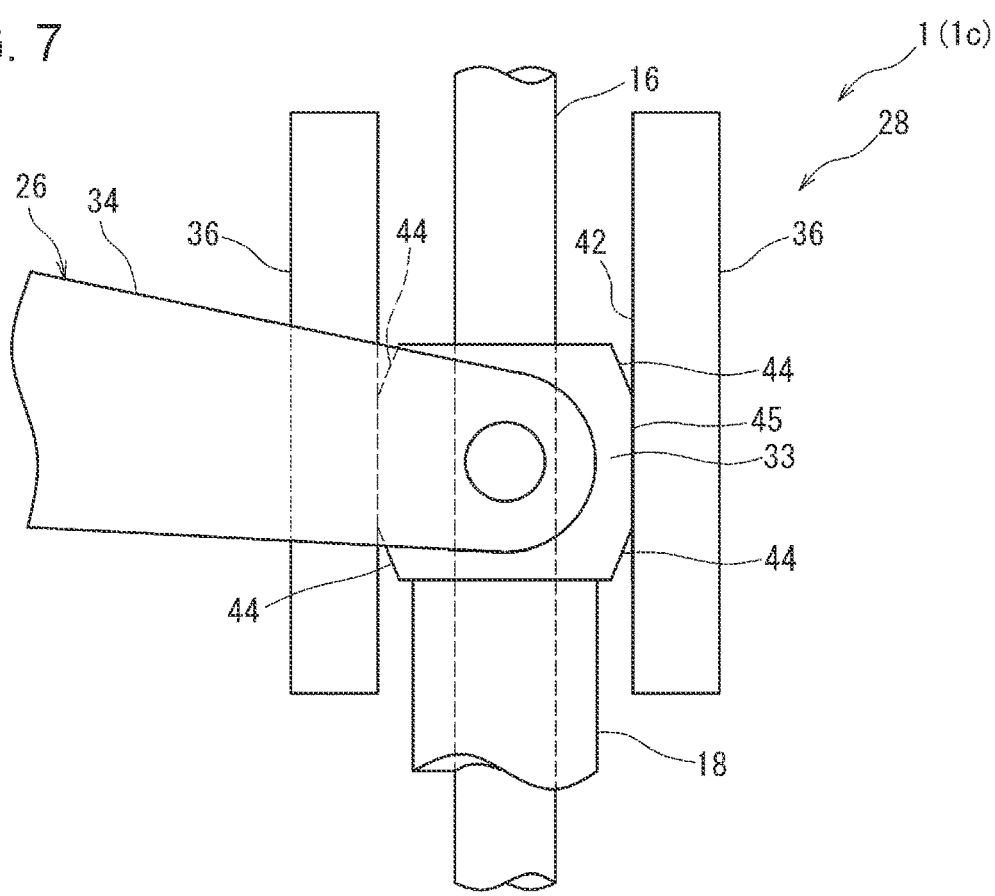
FIG. 7 is an enlarged side view schematically showing a linking part between the second valve rod and a lever and its surrounding, of a steam valve according to another embodiment.
Figure 8:
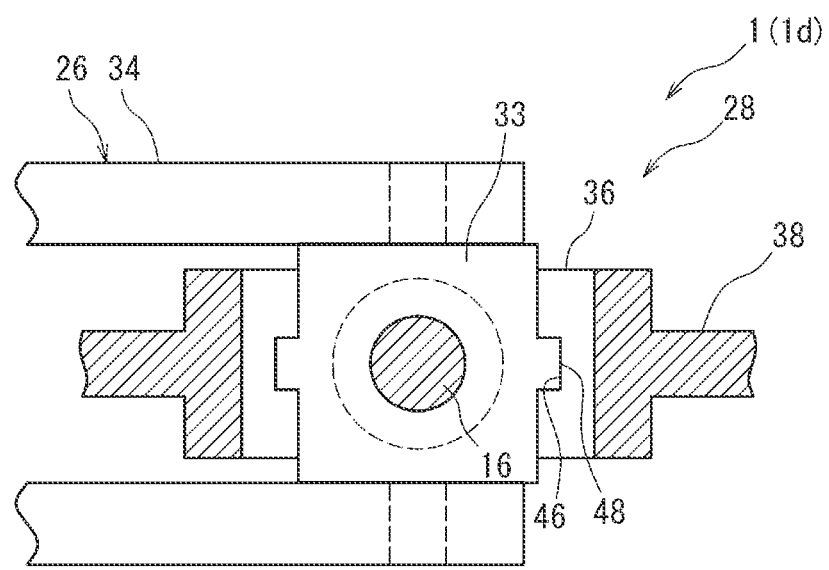
FIG. 8 is a side cross-sectional view schematically showing a linking part between the second valve rod and a lever and its surrounding at the height of the line VIII in FIG. 2, of a steam valve according to another embodiment.
Figure 9:
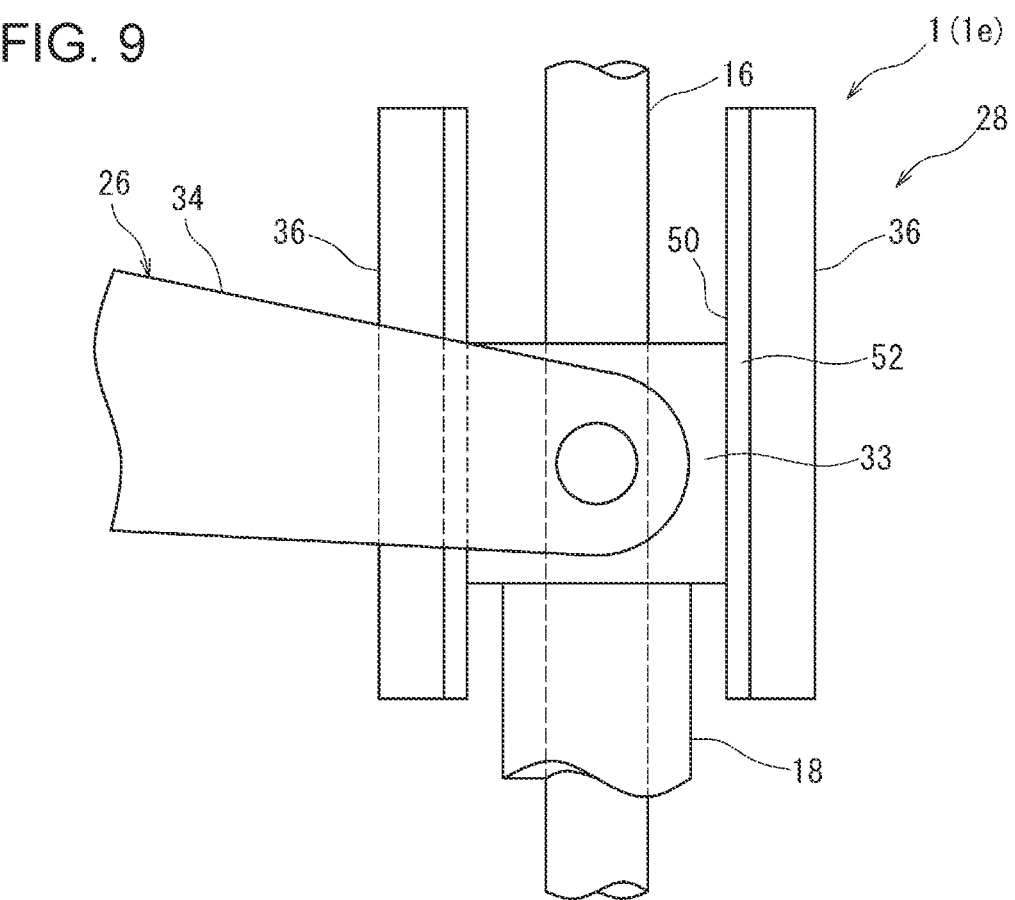
FIG. 9 is an enlarged side view schematically showing a linking part between the second valve rod and a lever and its surrounding, of a steam valve according to another embodiment.
Figure 10:
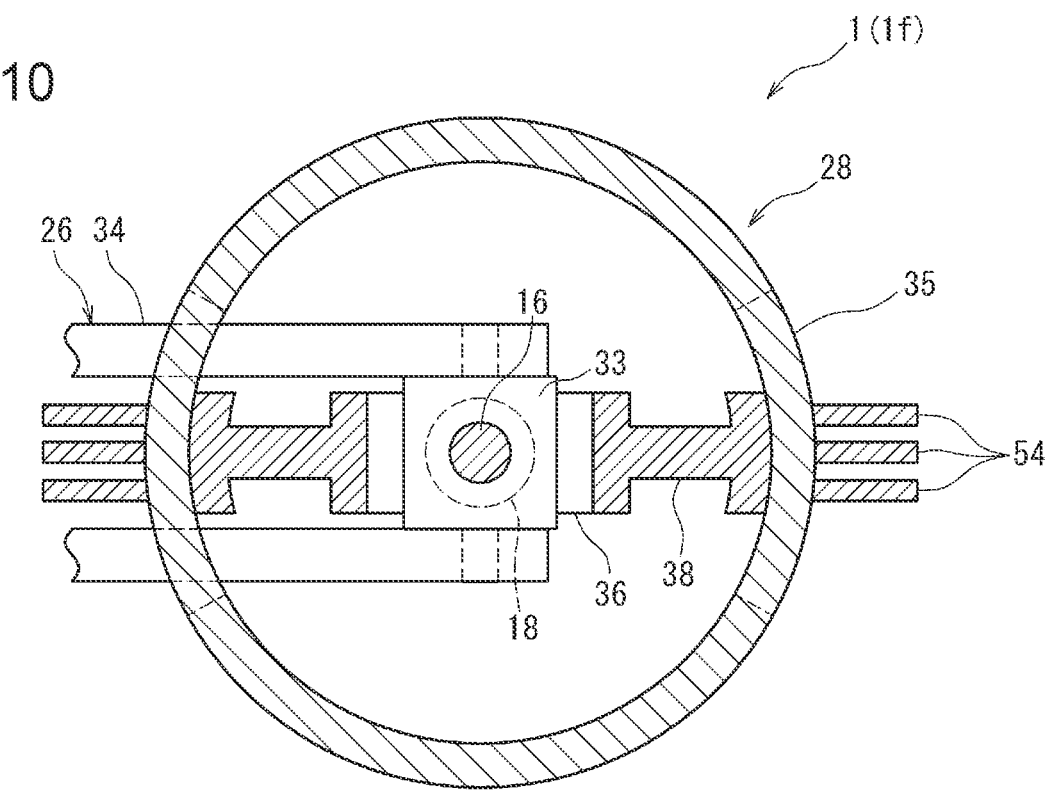
FIG. 10 is a side cross-sectional view schematically showing a linking part between the second valve rod and a lever and its surrounding at the height of the line VIII in FIG. 2, of a steam valve according to another embodiment.
Figure 11:
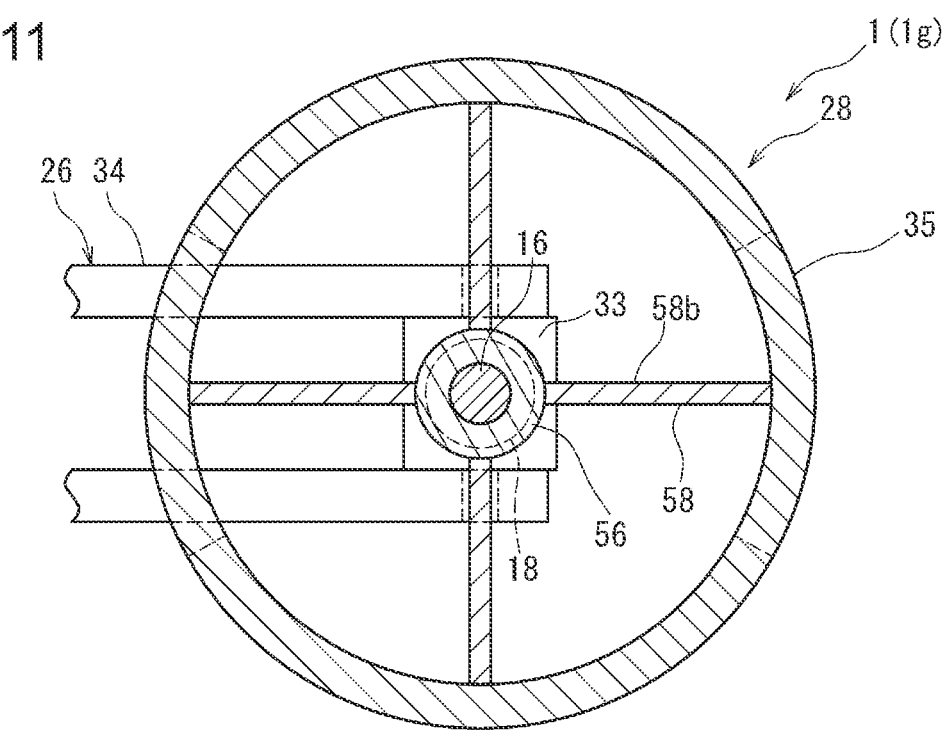
FIG. 11 is a side cross-sectional view schematically showing a linking part between the second valve rod and a lever and its surrounding at the height of the line VIII in FIG. 2, of a steam valve according to another embodiment.
Figure 12:
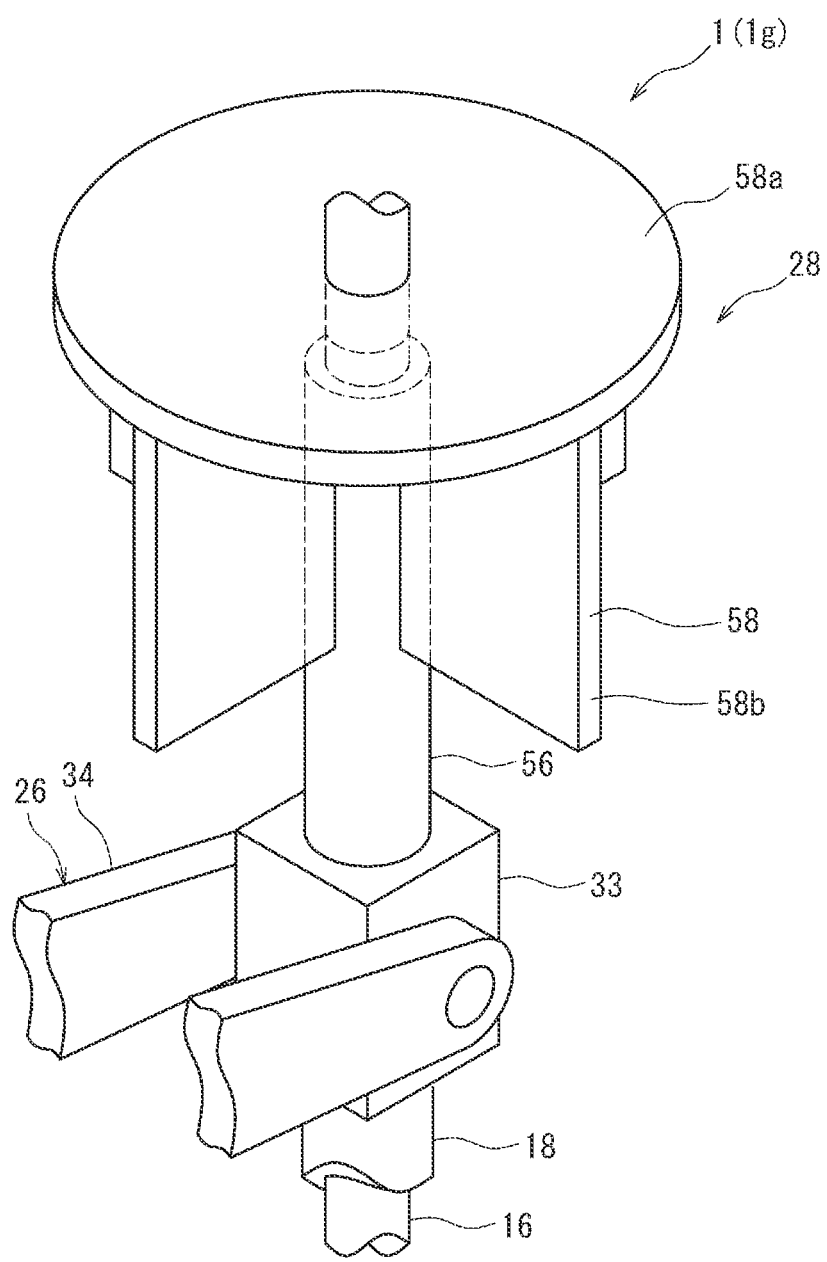
FIG. 12 is a perspective view schematically showing a linking part between the second valve rod and a lever and its surrounding in FIG. 11.
Figure 13:
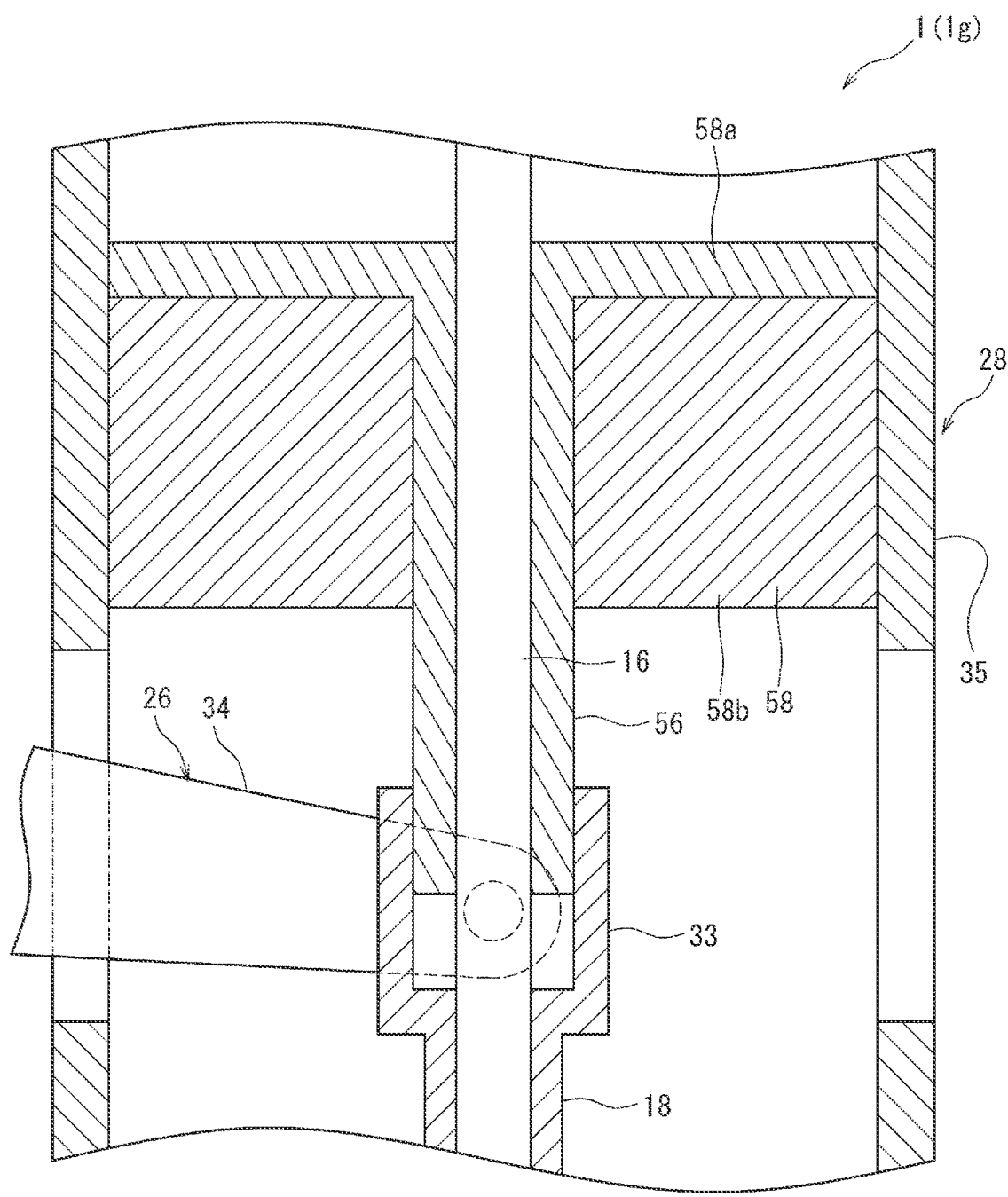
FIG. 13 is a vertical cross-sectional view schematically showing a linking part between the second valve rod and a lever and its surrounding in FIG. 11.
Figure 14:
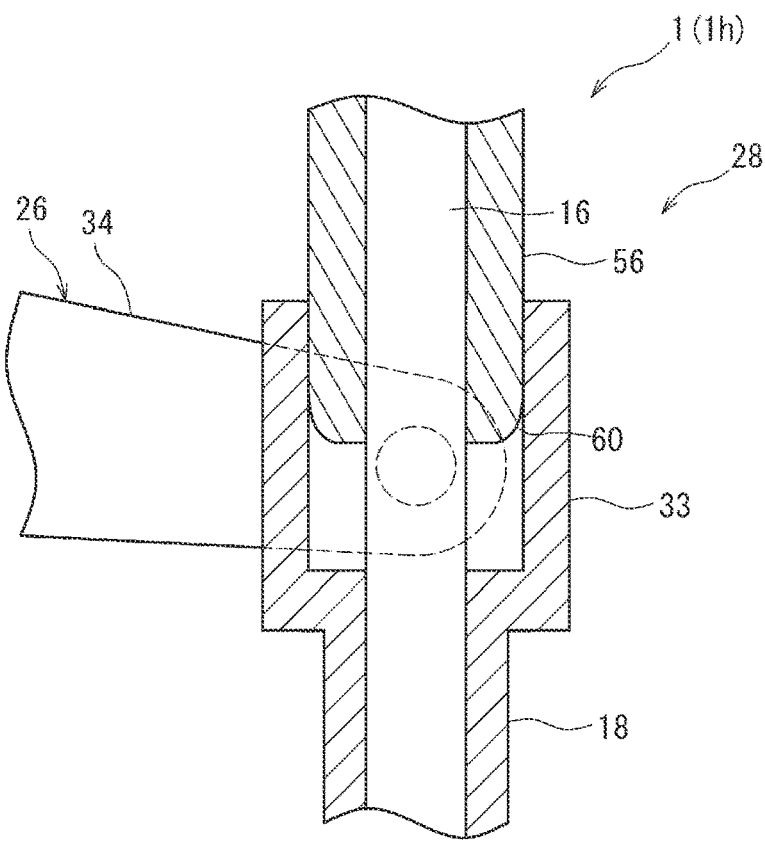
FIG. 14 is a vertical cross-sectional view schematically showing a linking part between the second valve rod and a lever and its surrounding, of a steam valve according to another embodiment.
Figure 15:
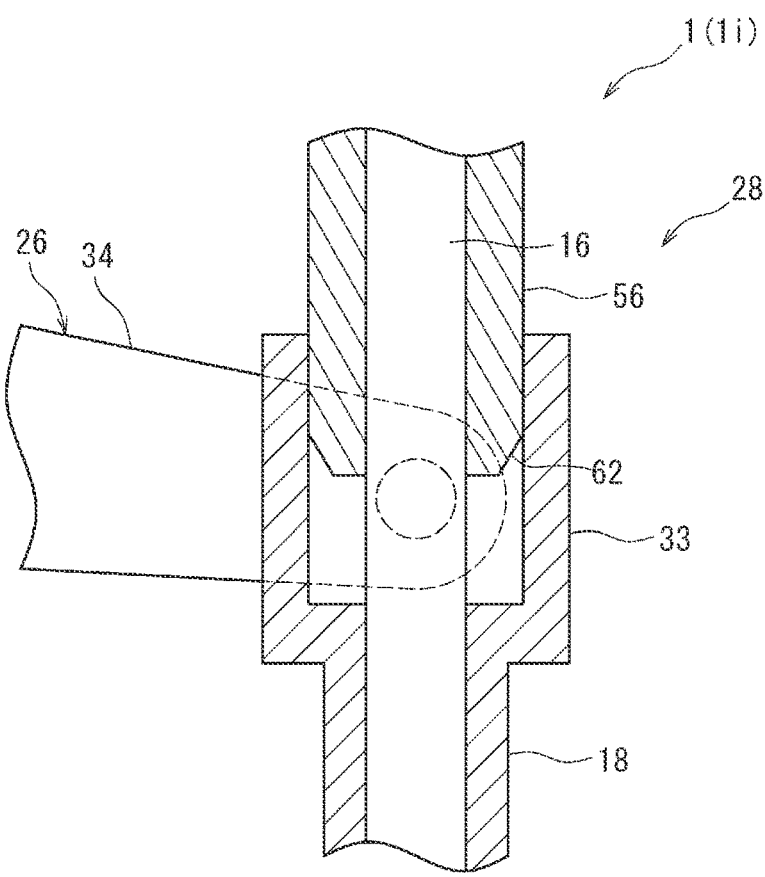
FIG. 15 is a vertical cross-sectional side view schematically showing a linking part between the second valve rod and a lever and its surrounding, of a steam valve according to another embodiment.
Figure 16:
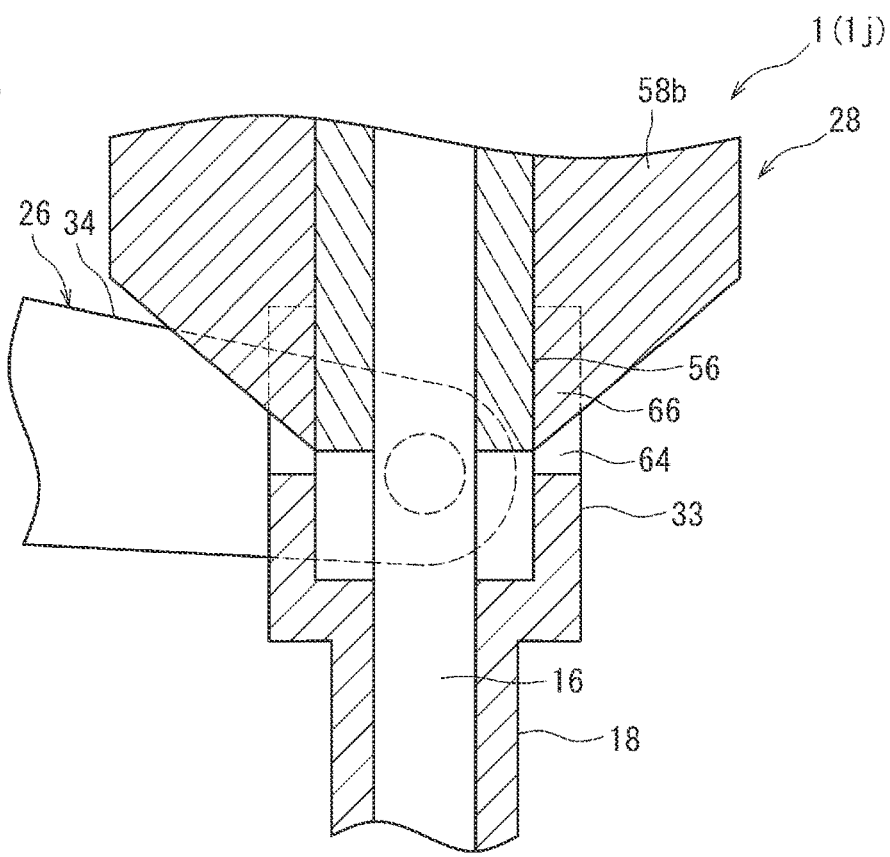
FIG. 16 is a vertical cross-sectional side view schematically showing a linking part between the second valve rod and a lever and its surrounding, of a steam valve according to another embodiment.
Figure 17:
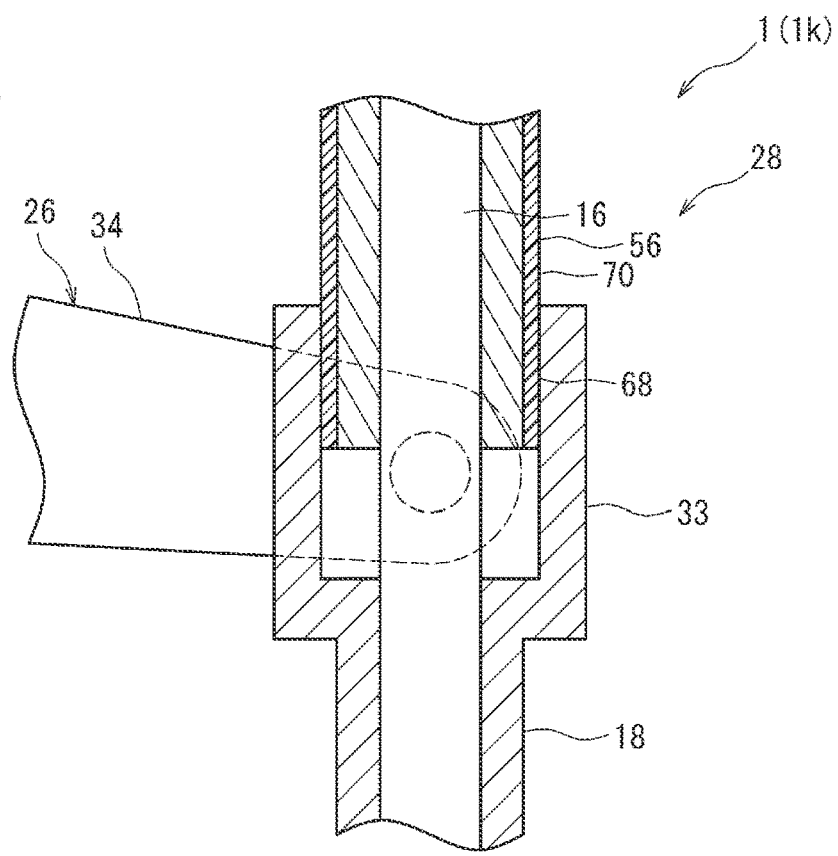
FIG. 17 is a vertical cross-sectional side view schematically showing a linking part between the second valve rod and a lever and its surrounding, of a steam valve according to another embodiment.

FIG. 2 is a schematic cross-sectional view of a steam valve 1 (1a) according to an embodiment of the present invention. FIG. 3 is an enlarged schematic view of the region III in FIG. 2. FIG. 4 is an enlarged schematic view of the region IV in FIG. 2. FIG. 5 is a perspective enlarged view schematically showing a linking part between the second valve rod and a lever and its surrounding in FIG. 4. FIG. 6 is an enlarged side view schematically showing a linking part between the second valve rod and a lever and its surrounding, of a steam valve 1 (1b) according to another embodiment. FIG. 7 is an enlarged side view schematically showing a linking part between the second valve rod and a lever and its surrounding, of a steam valve 1 (1c) according to another embodiment. FIG. 8 is a side cross-sectional view schematically showing a linking part between the second valve rod and a lever and its surrounding at the height of the line VIII in FIG. 2, of a steam valve 1 (1d) according to another embodiment. FIG. 9 is an enlarged side view schematically showing a linking part between the second valve rod and a lever and its surrounding, of a steam valve 1 (1e) according to another embodiment. FIG. 10 is a side cross-sectional view schematically showing a linking part between the second valve rod and a lever and its surrounding at the height of the line VIII in FIG. 2, of a steam valve 1 (1f) according to another embodiment. FIG. 11 is a side cross-sectional view schematically showing a linking part between the second valve rod and a lever and its surrounding at the height of the line VIII in FIG. 2, of a steam valve 1 (1g) according to another embodiment. FIG. 12 is a perspective view schematically showing a linking part between the second valve rod and a lever and its surrounding in FIG. 11. FIG. 13 is a vertical cross-sectional view schematically showing a linking part between the second valve rod and a lever and its surrounding in FIG. 11. FIG. 14 is a vertical cross-sectional view schematically showing a linking part between the second valve rod and a lever and its surrounding, of a steam valve 1 (1h) according to another embodiment. FIG. 15 is a vertical cross-sectional side view schematically showing a linking part between the second valve rod and a lever and its surrounding, of a steam valve 1 (1i) according to another embodiment. FIG. 16 is a vertical cross-sectional side view schematically showing a linking part between the second valve rod and a lever and its surrounding, of a steam valve 1 (1j) according to another embodiment. FIG. 17 is a vertical cross-sectional view schematically showing a linking part between the second valve rod and a lever and its surrounding, of a steam valve 1 (1k) according to another embodiment.

Like the steam valve 1a shown in FIGS. 2 and 3, the steam valve 1 (1a to 1k) includes a valve casing 10, the first valve body 12, the second valve body 14, the first valve rod 16, the second valve rod 18, the first actuator 20, the second actuator 22, the first link mechanism 24, the second link mechanism 26, and the guide mechanism 28.

The valve casing 10 includes a valve chest 29 defined inside the valve casing 10, an inlet flow passage 30 having an opening into the valve chest 29, an outlet flow passage (valve nozzle) 31 having an opening into the valve chest 29, and a valve seat 32 surrounding the opening of the outlet flow passage 31. For instance, the outlet flow passage 31 extends in the vertical direction, and the valve seat 32 has a funnel shape that spreads gradually upward.

The first valve body 12 is housed in the valve chest 29. The first valve body 12 is capable of being in contact with the valve seat 32 in the vertical direction.

The second valve body 14 is housed in the valve chest 29 coaxially with the first valve body 12, and is capable of being in contact with the valve seat 32 in the vertical direction.

The first valve rod 16 is capable of biasing the first valve body 12 in the vertical direction. The first valve body 12 is capable of being in contact with and separating from the valve seat 32 in the vertical direction, by being biased by the first valve rod 16. The first valve rod 16 is inserted through an upper section of the valve casing 10 air-tightly, extending from the first valve body 12 to the outside of the valve casing 10.

The second valve rod 18 is capable of biasing the second valve body 14 in the vertical direction. The second valve body 14 is capable of being in contact with and separating from the valve seat 32 in the vertical direction, by being biased by the second valve rod 18. The second valve rod 18 is inserted through an upper section of the valve casing 10 air-tightly, extending from the second valve body 14 to the outside of the valve casing 10. Further, the second valve rod 18 has a hollow cylindrical shape, and the first valve rod 16 extends so as to be inserted through the inside of the second valve rod 18 air-tightly.

Further, the first valve rod 16 extends so as to be inserted through the upper section of the second valve body 14.

The first actuator 20 is disposed outside the valve casing 10, and is capable of applying a first biasing force to the first valve rod 16 in the vertical direction. For instance, the first actuator 20 may include a hydraulic cylinder or the like.

The second actuator 22 is disposed outside the valve casing 10, and is capable of applying a second biasing force to the second valve rod 18 in the vertical direction. For instance, the second actuator 22 may include a hydraulic cylinder or the like.

The first link mechanism 24 is disposed between the first actuator 20 and the first valve rod 16, and is capable of transmitting the first biasing force from the first actuator 20.

The second link mechanism 26 is disposed between the second actuator 22 and the second valve rod 18, and is capable of transmitting the second biasing force from the second actuator 22. The second link mechanism 26 includes a linking part 33 disposed integrally with the second valve rod 18, and a lever 34 pin-coupled to the linking part 33. For instance, the linking part 33 has a cylindrical shape, and the first valve rod 16 is inserted through the linking part 33 coaxially. Furthermore, for instance, the lever 34 includes a pair of plates, and end portions of the pair of plates are pin-coupled to the linking part 33 while holding the linking part 33 therebetween.

The guide mechanism 28 is capable of regulating horizontal displacement of the linking part 33 when the linking part 33 moves in the vertical direction in response to tilting of the lever 34.

In the steam valve 1 having the above configuration, the guide mechanism 28 regulates horizontal displacement of the linking part 33 to which the lever 34 is pin-coupled, and thus it is possible to prevent partial contact of the second valve rod 18 and a nearby part with a simplified configuration.

Further, in the steam turbine system 2 to which the steam valve 1 having the above configuration is applied, the steam turbine 4 is supplied with steam from the steam valve 1. In the steam valve 1, the guide mechanism 28 prevents partial contact of the second valve rod 18 and a nearby part with a simplified configuration, and thus the steam turbine system 2 has a high reliability.

In the above configuration, either one of the first valve body 12 and the second valve body 14 may be used as a stop valve, or a control valve. For instance, the first valve body 12 may be used as a control valve and the second valve body 14 may be used as a stop valve.

In some embodiments, as in the steam valve 1a to 1f partially shown in FIGS. 4 to 10, respectively, the guide mechanism 28 includes a support frame 35, a pair of guide plates 36, and a pair of support portions 38.

The support frame 35 is disposed above the valve casing 10. For instance, the support frame 35 has a cylindrical shape, and is fixed to the valve casing 10 while being arranged coaxially with the first valve rod 16 and the second valve rod 18.

The pair of guide plates 36 each extend in the vertical direction, and holds the linking part 33 from both sides in the horizontal direction. Herein, the direction in which the pair of guide plates 36 hold the linking part 33 and the direction in which the pair of levers 34 hold the linking part 33 are orthogonal to each other.

A pair of support portions 38 are each fixed to the support frame 35, and support the pair of guide plates 36, respectively.

With the above configuration, the guide plates 36 regulate horizontal displacement of the linking part 33 to which the lever 34 is pin-coupled, and thus it is possible to prevent partial contact of the second valve rod 18 and a nearby part with a simplified configuration.

Furthermore, the support frame 35 supporting the guide plates 36 via the support portions 38 is disposed above the valve casing 10, and thus has a temperature lower than that of the valve casing 10 when the steam valve 1a to 1f is in use. Thus, during operation of the steam valve 1a to 1f, deformation of the guide plates 36 due to a temperature increase is suppressed. This also prevents partial contact of the second valve rod 18 and a nearby object.

In some embodiments, as in the steam valve 1b shown in FIG. 6, the linking part 33 includes curved surfaces 40 in regions facing the guide plates 36. On each curved surface 40, the middle section in the vertical direction protrudes sideways as compared to the upper end portion and the lower end portion. Meanwhile, the regions of the guide plates 36 facing the curved surfaces 40 include flat surfaces 42 extending in the vertical direction.

With the above configuration, the linking part 33 has the curved surfaces 40, and thus partial contact between the linking part 33 and the guide plates 36 is prevented, which makes it possible to prevent partial contact between the second valve rod 18 and a nearby part even more reliably.

In some embodiments, as in the steam valve 1c shown in FIG. 7, the linking part 33 includes inclined surfaces 44 inclined in the vertical direction, on the upper side and the lower side of the regions facing the guide plates 36. Further, between the upper inclined surface 44 and the lower inclined surface 44, a flat surface 45 extends in the vertical direction.

With the above configuration, the linking part 33 has the inclined surfaces 44 on the upper side and the lower side of the regions facing the guide plates 36, and thus partial contact between the linking part 33 and the guide plates 36 is prevented, which makes it possible to prevent partial contact between the second valve rod 18 and a nearby part even more reliably.

In some embodiments, as in the steam valve 1d shown in FIG. 8, one of the linking part 33 or the guide plate 36 has a groove 46 extending in the vertical direction, and the other one of the linking part 33 or the guide plate 36 has a protrusion 48 being in engagement with the groove 46 so as to be slidable in the groove 46. For instance, the groove 46 is formed on the flat surface 42 of the guide plate 36, and the protrusion 48 is formed by a ridge formed on the flat surface of the linking part 33 facing the guide plate 36.

With the above configuration, the protrusion 48 is in engagement with the groove 46 extending in the vertical direction and thereby the linking part 33 moves in the vertical direction reliably, and thus partial contact between the linking part 33 and the guide plates 36 is prevented, which makes it possible to prevent partial contact between the second valve rod 18 and a nearby part even more reliably.

In some embodiments, as in the steam valve 1e shown in FIG. 9, one of the linking part 33 or the guide plate 36 includes a surface 50 made of heat-resistant resin, in a region facing the other one of the linking part 33 or the guide plate 36. Such a surface 50 can be achieved by forming a lubricant layer 52 of heat-resistant resin, on the surface of the linking part 33 or the guide plate 36. As a heat-resistant resin, PEEK resin (polyetheretherketone resin) can be used, for instance.

With the above configuration, one of the linking part 33 or the guide plate 36 includes the surface 50 made of heat-resistant resin in a region facing the other one of the linking part 33 or the guide plate 36, and thus the linking part 33 can move up and down smoothly even if the temperature of the linking part 33 or the guide plate 36 increases.

In some embodiments, as in the steam valve 1f shown in FIG. 10, the steam valve 1 may further include a heat dissipation portion 54 disposed integrally with the support frame 35. The heat dissipation portion 54 includes, for instance, a plurality of fins disposed integrally on the outer side of the support frame.

With the above configuration, the heat dissipation portion 54 is integrally formed on the support frame 35, and thus the temperature of the support frame 35 is even more lower than the temperature of the valve casing 10 during operation of the steam valve 1f. Thus, during operation of the steam valve 1f, deformation of the guide plates 36 due to a temperature increase is suppressed, and partial contact of the second valve rod 18 and a nearby part is prevented even more reliably.

In some embodiments, as in the steam valve 1g to 1k shown in FIGS. 11 to 17, the guide mechanism 28 includes a support frame 35, a guide cylinder 56, and a support portion 58.

The support frame 35 is disposed above the valve casing 10. For instance, the support frame 35 has a cylindrical shape, and is fixed to the valve casing 10 while being arranged coaxially with the first valve rod 16 and the second valve rod 18.

The guide cylinder 56 is interposed between the first valve rod 16 and the linking part 33. More specifically, the guide cylinder 56 extends in the vertical direction between the first actuator 20 and the linking part 33, and the first valve rod 16 is inserted through the guide cylinder 56. A cylindrical space is disposed between the first valve rod 16 and the linking part 33, and a lower end side of the guide cylinder 56 is positioned in the cylindrical space. Accordingly, the first valve rod 16 is surrounded by the guide cylinder 56 so as to be slidable, and the lower end side of the guide cylinder 56 is surrounded by the linking part 33 so as to be slidable.

The support portion 58 is fixed to the support frame 35, and supports the guide cylinder 56. For instance, the support portion 58 includes a flange portion 58a formed integrally with the guide cylinder 56 and facing outward, and a plurality of rib portions 58b formed integrally with the flange portion 48a and the guide cylinder 56. For instance, the flange portion 58a has a ring shape, and each rib portion 58b has a plate shape.

With the above configuration, the guide cylinder 56 regulates horizontal displacement of the linking part 33 to which the lever 34 is pin-coupled, and thus it is possible to prevent partial contact of the second valve rod 18 and a nearby part with a simplified configuration.

In some embodiments, as in the steam valve 1h shown in FIG. 14, the guide cylinder 56 includes a curved surface 60 in a lower-end side region facing the linking part 33.

With the above configuration, the guide cylinder 56 has the curved surface 60 in the lower-end side region facing the linking part 33, and thus partial contact between the linking part 33 and the guide cylinder 56 is prevented, which makes it possible to prevent partial contact between the second valve rod 18 and a nearby part even more reliably.

In some embodiments, as in the steam valve 1i shown in FIG. 15, the guide cylinder 56 includes a tapered surface 62 in a lower-end side region facing the linking part 33.

With the above configuration, the guide cylinder 56 has the tapered surface 62 in the lower-end side region facing the linking part 33, and thus partial contact between the linking part 33 and the guide cylinder 56 is prevented, which makes it possible to prevent partial contact between the second valve rod 18 and a nearby part even more reliably.

In some embodiments, as in the steam valve 1j shown in FIG. 16, one of the linking part 33 or the guide cylinder 56 has a groove 64 extending in the vertical direction, and the other one of the linking part 33 or the guide cylinder 56 has a protrusion 66 being in engagement with the groove 64 so as to be slidable in the groove 46.

With the above configuration, the protrusion 66 is in engagement with the groove 64 extending in the vertical direction and thereby the linking part 33 moves in the vertical direction reliably, and thus partial contact between the linking part 33 and the guide cylinder 56 is prevented, which makes it possible to prevent partial contact between the second valve rod 18 and a nearby part even more reliably.

In some embodiments, as in the steam valve 1f shown in FIG. 16, the protrusion 66 is formed integrally with the rib portion 58b.

In some embodiments, as in the steam valve 1k shown in FIG. 17, one of the linking part 33 or the guide cylinder 56 includes a surface 68 made of heat-resistant resin, in a region facing the other one of the linking part 33 or the guide plate 36. Such a surface 68 can be achieved by forming a lubricant layer 70 of heat-resistant resin, on the surface of the linking part 33 or the guide cylinder 56. As a heat-resistant resin, PEEK resin (polyetheretherketone resin) can be used, for instance.

With the above configuration, one of the linking part 33 or the guide cylinder 56 includes the surface 68 made of heat-resistant resin in a region facing the other one of the linking part 33 or the guide cylinder 56, and thus the linking part 33 can move up and down smoothly even if the temperature of the linking part 33 or the guide cylinder 56 increases.

In some embodiments, as shown in FIG. 2, the first actuator 20 is disposed above the valve casing 10 and the guide mechanism 28 coaxially with the first valve rod 16, and is supported by the support frame 35. In this case, the first link mechanism 24 is coupling the first actuator and the first valve rod 16 in series.

In some embodiments, as shown in FIG. 2, the second actuator 22 is disposed next to the valve casing 10, and the lever 34 extends in the horizontal direction and can pivot within a vertical plane.

In some embodiments, as shown in FIG. 3, the first valve body 12 includes a first cylindrical portion 72 having an end capable of making contact with the valve seat 32 in the vertical direction, and a first end wall portion 74 formed integrally on the other end portion of the first cylindrical portion 72. Meanwhile, the second valve body 14 includes the second cylindrical portion 76 and the second end wall portion 78. The second cylindrical portion 76 is disposed coaxially with the first cylindrical portion 72, and has an end portion capable of being in contact with the valve seat 32 in the vertical direction on the outer side of the first cylindrical portion 72 with respect to the radial direction of the first cylindrical portion 72. The second end wall portion 78 is formed integrally with an end portion side of the second cylindrical portion 76.

In some embodiments, as shown in FIG. 3, the steam valve 1 (1a to 1k) has the second valve body pressure equalizing mechanism 80 and the first valve body pressure equalizing mechanism 82.

The second valve body pressure equalizing mechanism 80 is capable of bringing into communication a valve body internal space 84 surrounded by the first cylindrical portion 72 and the second cylindrical portion 76 between the first end wall portion 74 and the second end wall portion 78 and a valve body external space 86 outside the second valve body 14. Furthermore, the second valve body pressure equalizing mechanism 80 is capable of blocking communication between the valve body internal space 84 and the valve body external space 86 as needed.

The first valve body pressure equalizing mechanism 82 is capable of bringing into communication the outlet flow passage 31 and the valve body internal space 84. Furthermore, the first valve body pressure equalizing mechanism 82 is capable of blocking communication between the outlet flow passage 31 and the valve body internal space 84 as needed.

With the above configuration, the first valve body pressure equalizing mechanism 82 equalizes the upward and downward pressures applied to the first valve body 12. Thus, it is possible to operate the first valve body 12 with a small biasing force. Accordingly, a small-size actuator can be used as the first actuator 20.

Furthermore, with the above configuration, the second valve body pressure equalizing mechanism 80 equalizes the upward and downward pressures applied to the second valve body 14. Thus, it is possible to operate the second valve body 14 with a small biasing force. Accordingly, a small-size actuator can be used as the second actuator 22.

In some embodiments, as shown in FIG. 3, the first valve body pressure equalizing mechanism 82 includes a first pressure equalizing axial directional nozzle 88, a first pressure equalizing valve body 90, a first pressure equalizing upper valve seat 92, and a first pressure equalizing lower valve seat 94.

The first pressure equalizing axial directional nozzle 88 extends in the vertical direction through the center portion of the first end wall portion 74.

The first pressure equalizing valve body 90 is mounted to the lower end of the first valve rod 16, and is arranged so as to be capable of changing position in the vertical direction inside the first pressure equalizing axial directional nozzle 88.

The first pressure equalizing upper valve seat 92 is disposed in the vicinity of the upper opening of the first pressure equalizing axial directional nozzle 88, and the first pressure equalizing valve body 90 is capable of making contact with the first pressure equalizing upper valve seat 92 by changing position upward.

The first pressure equalizing lower valve seat 94 is disposed in the vicinity of the lower opening of the first pressure equalizing axial directional nozzle 88, and the first pressure equalizing valve body 90 is capable of making contact air-tightly with the first pressure equalizing lower valve seat 94 by changing position downward.

When the first pressure equalizing valve body 90 is separated from the first pressure equalizing lower valve seat 94, the outlet flow passage 31 and the valve body internal space 84 are in communication.

In some embodiments, as shown in FIG. 3, the second valve body pressure equalizing mechanism 80 includes a second pressure equalizing axial directional nozzle 96, a second pressure equalizing radial directional nozzle 98, a second pressure equalizing valve body 100, a second pressure equalizing upper valve seat 102, and a second pressure equalizing lower valve seat 104.

The second pressure equalizing axial directional nozzle 96 extends in the vertical direction through the center portion of the second end wall portion 78. The second pressure equalizing radial directional nozzle extends through the second end wall portion 78 in the radial direction, extending between the second pressure equalizing axial directional nozzle 96 and the outer peripheral surface of the second end wall portion 78.

The second pressure equalizing valve body 100 is mounted to the lower end of the second valve rod 18, and is arranged so as to be capable of changing position in the vertical direction inside the second pressure equalizing axial directional nozzle 96.

The second pressure equalizing upper valve seat 102 is disposed in the vicinity of the upper opening of the second pressure equalizing axial directional nozzle 96, and the second pressure equalizing valve body 100 is capable of making contact with the second pressure equalizing upper valve seat 102 air-tightly by changing position upward.

The second pressure equalizing lower valve seat 104 is disposed in the vicinity of the lower opening of the second pressure equalizing axial directional nozzle 96, and the second pressure equalizing valve body 100 is capable of making contact air-tightly with the second pressure equalizing lower valve seat 104 by changing position downward.

When the second pressure equalizing valve body 100 is separated from the second pressure equalizing lower valve seat 104, the valve body internal space 84 and the valve body external space 86 are in communication through the second pressure equalizing axial directional nozzle 96 and the second pressure equalizing radial directional nozzle 98.

In some embodiments, as shown in FIG. 3, a seal member 106 having a ring shape is disposed between the first cylindrical portion 72 and the second cylindrical portion 76. The seal member 106 regulates the flow of steam in the gap between the first cylindrical portion 72 and the second cylindrical portion 76.

In some embodiments, as shown in FIG. 3, the outer diameter of the lower end portion (seal portion) of the first cylindrical portion 72 is greater than the outer diameter of the middle portion of the first cylindrical portion 72, and the lower end portion of the first cylindrical portion 72 is formed to have a greater thickness than the middle portion of the first cylindrical portion 72 or the lower end portion (seal portion) of the second cylindrical portion 76, in the radial direction of the first cylindrical portion 72. Further, the second cylindrical portion 76 has a stepped cylindrical shape. The lower end side of the second cylindrical portion 76 has a greater diameter than the upper end side of the second cylindrical portion 76. The gap between the lower end side of the first cylindrical portion 72 and the lower end side of the second cylindrical portion 76 is greater than the gap between the upper end side of the first cylindrical portion 72 and the lower end side of the second cylindrical portion 76.

In some embodiments, as shown in FIG. 2, the second link mechanism 26 further includes a link 108 and a link 110. The link 108 extends in the vertical direction, and the lower end portion of the link 108 is pin-coupled to the middle portion of the lever 34. The upper end portion of the lever 34 is pin-coupled to a stationary structural body. The link 110 also extends in the vertical direction, and the upper end portion of the link 110 is pin-coupled to the end portion of the lever 34 opposite to the linking part 33. Further, the lower end portion of the link 110 is pin-coupled to the second actuator 22.

In this case, the lever 34 is capable of tilting about the middle portion at which the lever 34 is pin-coupled to the link 108, and is capable of changing position in the horizontal direction at the same time with tilting through pivoting of the links 108, 110. Thus, when the lever 34 tilts, a lateral force applied to the linking part 33 in the horizontal direction is reduced. Nevertheless, the lateral force cannot be eliminated completely. Thus, in a case where the links 108, 110 are provided, it is still possible to prevent partial contact of the second valve rod 18 and a nearby part by regulating horizontal displacement of the linking part 33 to which the lever 34 is pin-coupled with the guide mechanism 28.

Embodiments of the present invention were described in detail above, but the present invention is not limited thereto, and various amendments and modifications may be implemented.

DESCRIPTION OF REFERENCE NUMERALS 1 (1a to 1k) Steam valve
2 Steam turbine system
4 Steam turbine
6 Generator
10 Valve casing
12 First valve body
14 Second valve body
16 First valve rod
18 Second valve rod
20 First actuator
22 Second actuator
24 First link mechanism
26 Second link mechanism
28 Guide mechanism
29 Valve chest
30 Inlet flow passage
31 Outlet flow passage
32 Valve seat
33 Linking part
34 Lever
35 Support frame
36 Guide plate
48 Support portion
40 Curved surface
42 Flat surface
44 Inclined surface
45 Flat surface
46 Groove
48 Protrusion
50 Surface
52 Lubricant layer
54 Heat dissipation portion
56 Guide cylinder
58 Support portion
58a Flange portion
58b Rib portion
60 Curved surface
62 Tapered surface
64 Groove
66 Protrusion
68 Surface
70 Lubricant layer
72 First cylindrical portion
74 First end wall portion
76 Second cylindrical portion
78 Second end wall portion
80 Second valve body pressure equalizing mechanism
82 First valve body pressure equalizing mechanism
84 Valve body internal space
86 Valve body external space
88 First pressure equalizing axial directional nozzle
90 First pressure equalizing valve body
92 First pressure equalizing upper valve seat
94 First pressure equalizing lower valve seat
96 Second pressure equalizing axial directional nozzle
98 Second pressure equalizing radial directional nozzle
100 Second pressure equalizing valve body
102 Second pressure equalizing upper valve seat
104 Second pressure equalizing lower valve seat
106 Seal member
108 Link
110 Link

The invention claimed is:

1. A steam valve, comprising:
a valve casing having a valve chest, an inlet flow passage having an opening into the valve chest, an outlet flow passage having an opening into the valve chest, and a valve seat surrounding the opening of the outlet flow passage;
a first valve body housed in the valve chest and capable of making contact with the valve seat in a vertical direction;
a second valve body housed in the valve chest coaxially with the first valve body and capable of making contact with the valve seat in the vertical direction;
a second valve rod inserted through an upper section of the valve casing in the vertical direction and extending from the second valve body to an outside of the valve casing;
a first valve rod inserted through an inside of the second valve rod and extending from the first valve body to the outside of the valve casing;
a first actuator disposed outside the valve casing and capable of applying a first biasing force in the vertical direction to the first valve rod;
a second actuator disposed outside the valve casing and capable of applying a second biasing force in the vertical direction to the second valve rod;
a first link mechanism disposed between the first actuator and the first valve rod and capable of transmitting the first biasing force;
a second link mechanism disposed between the second actuator and the second valve rod and capable of transmitting the second biasing force, the second link mechanism having a linking part provided integrally with the second valve rod and a lever which is pin-coupled to the linking part; and
a guide mechanism capable of regulating horizontal displacement of the linking part when the linking part moves in the vertical direction in response to tilting of the lever,
wherein the guide mechanism includes:
a support frame disposed above the valve casing;
a pair of guide plates each extending in the vertical direction, and holding the linking part from both sides in a horizontal direction; and
a pair of support portions each fixed to the support frame, and supporting the pair of guide plates respectively.

2. The steam valve according to claim 1, wherein the linking part has curved surfaces in regions facing the guide plates.

3. The steam valve according to claim 1, wherein the linking part includes inclined surfaces on an upper side and a lower side of regions facing the guide plates.

4. The steam valve according to claim 1,
wherein one of the linking part or each guide plate has a groove extending in the vertical direction, and
wherein the other one of the linking part or each guide plate has a protrusion which is in engagement with the groove so as to be slidable in the groove.

5. The steam valve according to claim 1, wherein one of the linking part or each guide plate has a surface comprising a heat-resistant resin in a region facing the other one of the linking part or each guide plate.

6. A steam valve comprising:
a valve casing having a valve chest, an inlet flow passage having an opening into the valve chest, an outlet flow passage having an opening into the valve chest, and a valve seat surrounding the opening of the outlet flow passage;
a first valve body housed in the valve chest and capable of making contact with the valve seat in a vertical direction;
a second valve body housed in the valve chest coaxially with the first valve body and capable of making contact with the valve seat in the vertical direction;
a second valve rod inserted through an upper section of the valve casing in the vertical direction and extending from the second valve body to an outside of the valve casing;
a first valve rod inserted through an inside of the second valve rod and extending from the first valve body to the outside of the valve casing;
a first actuator disposed outside the valve casing and capable of applying a first biasing force in the vertical direction to the first valve rod;
a second actuator disposed outside the valve casing and capable of applying a second biasing force in the vertical direction to the second valve rod;
a first link mechanism disposed between the first actuator and the first valve rod and capable of transmitting the first biasing force;

a second link mechanism disposed between the second actuator and the second valve rod and capable of transmitting the second biasing force, the second link mechanism having a linking part provided integrally with the second valve rod and a lever which is pin-coupled to the linking part; and
a guide mechanism capable of regulating horizontal displacement of the linking part when the linking part moves in the vertical direction in response to tilting of the lever,
wherein the guide mechanism includes:
a support frame disposed above the valve casing;
a guide cylinder interposed between the first valve rod and the linking part; and
a support portion fixed to the support frame and supporting the guide cylinder.

7. The steam valve according to claim 6, wherein the guide cylinder has a curved surface in a lower-end side region facing the linking part.

8. The steam valve according to claim 6, wherein the guide cylinder has a tapered surface in a lower-end side region facing the linking part.

9. The steam valve according to claim 6,
wherein one of the linking part or the guide cylinder has a groove extending in the vertical direction, and
wherein the other one of the linking part or the guide cylinder has a protrusion in engagement with the groove so as to be slidable in the groove.

10. The steam valve according to claim 6, wherein one of the linking part or the guide cylinder has a surface comprising a heat-resistant resin in a region facing the other one of the linking part or the guide cylinder.

11. A steam turbine system, comprising:
the steam valve according to claim 1; and
a steam turbine configured to be supplied with steam from the steam valve.

12. A steam turbine system, comprising:
the steam valve according to claim 6; and
a steam turbine configured to be supplied with steam from the steam valve.

* * * * *